United States Patent [19]

Larsen

[11] Patent Number: 4,699,469

[45] Date of Patent: Oct. 13, 1987

[54] LIQUID CRYSTAL DISPLAY

[75] Inventor: Thor A. Larsen, Woodstock, N.Y.

[73] Assignee: International Business Machines Corporation, Armonk, N.Y.

[21] Appl. No.: 724,128

[22] Filed: Apr. 17, 1985

[51] Int. Cl.[4] .......................................... G02F 1/133
[52] U.S. Cl. .................................................... 350/333
[58] Field of Search ............... 350/331, 332, 333, 334, 350/335, 336; 361/320

[56] References Cited

U.S. PATENT DOCUMENTS

| | | | |
|---|---|---|---|
| 3,862,360 | 1/1975 | Dill et al. | 350/334 X |
| 3,863,247 | 1/1975 | Hosokawa | 350/332 X |
| 4,050,064 | 9/1977 | Hashimoto | 350/332 X |
| 4,089,038 | 5/1978 | Bacher | 361/320 |
| 4,093,355 | 6/1978 | Kaplit et al. | 350/334 |
| 4,103,297 | 7/1978 | McGreivy et al. | 350/333 X |
| 4,116,544 | 9/1978 | Soref | 350/336 |
| 4,432,610 | 2/1984 | Kobayashi et al. | 350/331 R |
| 4,591,849 | 5/1986 | Hughes et al. | 350/332 X |
| 4,600,273 | 7/1986 | Ohno | 350/336 |
| 4,602,850 | 7/1986 | De Benedetti | 350/336 X |

OTHER PUBLICATIONS

I.B.M. Techical Disclosure Bulletin, vol. 23, No. 6, Nov. 1980, pp. 2557-2558.
I.E.E.E. Electron Device Letters, vol. EDL-1, No. 9, Sep. 1980, p. 1797.

Primary Examiner—Donald A. Griffin
Attorney, Agent, or Firm—George E. Clark

[57] ABSTRACT

A high content LCD includes, a glass plate; a polysilicon deposited substrate supporting a matrix of electrodes; each of the electrodes defining a picture element (pel) in the LCD; a liquid crystal material interposed between the glass plate and the substrate; a plurality of FET devices, there being one or more FET device associated with each of the electrodes; and means for selectively actuating the FET devices to display an image on the LCD.

6 Claims, 4 Drawing Figures

LIQUID CRYSTAL DISPLAY

BACKGROUND OF THE INVENTION

1. Field of the Invention

The present invention relates to display devices and more particularly to liquid crystal display devices.

2. Description of the Prior Art

The following are circuits representative of the prior art.

U. S. Pat. No. 3,872,360 to Dill et al. shows a drive system for a dynamic scattering liquid crystal display material which is driven by a D.C. signal applied via a capacitor. The capacitor is selected and periodically charged by a transistor. The patented drive system employs a D.C. voltage signal in the range of twenty to thirty volts to drive a dynamic scattering LCD, whereas the drive circuit according to the present invention employs an A.C. signal in the range of 1.5 volts rms to drive a twisted nematic liquid crystal display material. Dynamic scattering liquid crystal display material has yet to be proven to be reliable and the higher D.C. voltage imposes considerable stress and limitation on the drive circuits.

U.S. Pat. No. 4,239,346 to Lloyd described a fabrication technique for the drive system in U.S. Pat. No. 3,872,366 described above.

U.S. Pat. No. 4,094,582 to Goodman et al. describes a drive system for a LCD employing a single FET device per liquid crystal PEL. The device does not have memory and develops significant D.C. voltage across the liquid PEL. The lack of memory limits the system of the patent to relatively low density and/or very high refresh rates. Further, the development of the D.C. voltage across the liquid crystal PEL reduces reliability of the liquid crystal material. The drive system according to the present invention has built in memory and eliminates D.C. build up across the liquid crystal PEL.

U.S. Pat. No. 3,485,292 to Nonomura et al. describes a segmented liquid crystal display as opposed to a matrix LCD. As with U.S. Pat. No. 3,873,360 described above, the circuit includes a transistor plus a capacitor driving the LCD segment. As before, this system suffers from the yield and reliability disadvantages of the capacitor. The drive system according to the present invention has built in memory and does not require capacitors for storage of PEL drive data.

U.S. Pat. No. 4,103,297 to McGreivey et al. appears to be an improvement to U.S. Pat. Nos. 3,973,360 and 4,239,346 described above in which an ion implantation is used to create a light sensitive FET structure driving each individual PEL. However, the circuit still employs a transistor plus a capacitor with the disadvantages as described above.

IBM Technical Disclosure Bulletin Vol. 23, Number 6, November, 1980, at page 2557 describes a liquid crystal drive system requiring a capacitor and a resistor per picture element (PEL).

IBM Technical Disclosure Bulletin Vol. 24, Number 7B, December, 1981, page 3681 describes a A.C. drive system for a LCD requiring a capacitor for storage for each PEL.

Although the prior art shows a variety of techniques for driving liquid crystal display systems, none of the prior art identified above shows a drive system in which internal memory for each PEL driver eliminates the need for a separate memory device such as a capacitor.

In an article by DiMaria et al. in the IEEE Electron Devices Letters, Vol. EDL-1, Number 9, Page 1797; September, 1980, a dual electron injector structure is described which includes an electrically alterable memory employing a floating polycrystalline silicon storage layer and silicon rich SiO electron injectors. The article generally describes the electrically alterable memory using a dual electron injector structure. However, the article does not describe nor suggest the circuit structure employed in a preferred embodiment of the present invention.

U.S. Pat. No. 4,104,675 shows the the use of a graded band-gap structure of silicon enriched $SiO_2$ between pure $SiO_2$ and metal or silicon to significantly enhance the injection of either holes or electrons from conductor through the silicon enriched insulator. It is this concept which is used in the creation of the DEIS, the memory device described by DiMaria et al discussed above. The patent and the referenced article in no way suggest the LCD drive circuit of the present invention.

A paper presented at the 1981 IEEE International Solid States Circuit Conference at Page 38 of the proceedings thereof, describes a dual gate floating gate FET device which operates with a single polarity voltage and which has a writeerase operation independent of the field effect transistor action. The present invention incorporates a similar type of 'dual gate' dual electron injection structure (DEIS) as described above into the PEL drive circuitry. The DEIS device function is to store the state of the PEL, ie. either selected or not selected. In the selected state, the DEIS device is conductive and the AC drive signal is imposed across the LC cell. On the other hand, when the DEIS device is programmed 'off', it is in its open ciruit condition and thereby isolates the AC signal from the LC PEL.

However, instead of utilizing the DEIS structure on single crystalline silicon as above, the present invention incorporates the dual gate DEIS structure on polysilicon. The processing techniques used to create the DEIS structure is consistent with the processing techniques used for making polysilicon FET devices for large area display devices. Specifically, there processes include low pressure chemical vapor depositions at relatively low temperatures (600 degrees C). The circuits, devices and processes are discussed in greater detail below.

The Paper 'Polysilicon FET Devices for Large Area Input/Output Applications' by S. Depp, A. Juliana and B. Huth in the IEDM Technical Digest, pp 703–706, 1980, in addition to describing the FET device characteristics of polysilicon devices, also describes PEL circuit drive schemes for large area LCD's.

The PEL drive circuitry descibed in the Article also eliminates the capacitor as a memory element per PEL, being replaced by a memory circuit. The memory circuit is a classic latch or flip-flop. In one case, the circuit consists of 4 transistors and 2 polysilicon resistors and in the second case, a CMOS version, the resistors are replaced with active devices. The first version, somewhat simpler to fabricate, consumes DC power, the level a function of process capability. The second case, the CMOS latch dissipates no DC power but has a total of 6 active devices.

In summary, the PEL ciruits suggested by S. Depp et al. do have built-in memory which is considerably more complex than the present invention.

SUMMARY OF THE INVENTION

Therefore, it is a primary object of the present invention to display images on a liquid crystal display device including a glass plate; a polysilicon deposited substrate supporting a matrix of electrodes; each of said electrodes defining a picture element (pel) in said LCD; a liquid crystal material interposed between said glass plate and said substrate; a plurality of FET devices, there being one or more FET device associated with each of said electrodes; and means for selectively actuating said FET devices to display an image on said LCD.

It is another object of the present invention to display images on a high content liquid crystal display device (LCD) as above, wherein the substrate includes a fused quartz material.

It is still another object of the present invention to display images on a high content liquid crystal display device (LCD) as above, wherein the substrate includes alumina.

It is yet another object of the present invention to display images on a high content liquid crystal display device (LCD) as above, wherein the liquid crystal material includes a twisted nematic liquid crystal material.

Accordingly, a high content LCD embodying the present invention includes, a glass plate; a polysilicon deposited substrate supporting a matrix of electrodes; each of said electrodes defining a picture element (pel) in the LCD; a liquid crystal material interposed between the glass plate and said substrate; a plurality of FET devices, there being one or more FET device associated with each of the electrodes; and means for selectively actuating the FET devices to display an image on the LCD.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF PREFERRED EMBODIMENTS OF THE INVENTION

Large area, or high picture element (PEL) content liqud crystal displays need to be driven using "active matrix addressing" versus passive matrix addressing associated with multiplex displays. In a passively addressed display, the electric field across a liquid crystal "CELL" is determined by the coincident fields of respective X lines and Y lines at CELL locations, however, with active addressing, the address lines control active devices which are in electrical contact with individual PELs.

The present invention employs a type of liquid crystal material known as twisted nematic with dye. This material has the key attribute of requiring very small A.C. signals (in the order of 0.5 to 1.5 volts rms) to change the optical characteristic from opaque to transparent (with the use of a single polarizer).

However, a key problem with driving liquid crystal is that there must be no D.C. component of the signal across the liquid crystal PEL greater than 25 millivolts.

As liquid crystal material has no memory characteristic, it is necessary to have an electronic memory element, (such as a latch, capacitor, etc.) associated with each liquid crystal PEL.

The type of liquid crystal display which could take advantage of the present invention includes a silicon based liquid crystal display.

Figure 1:
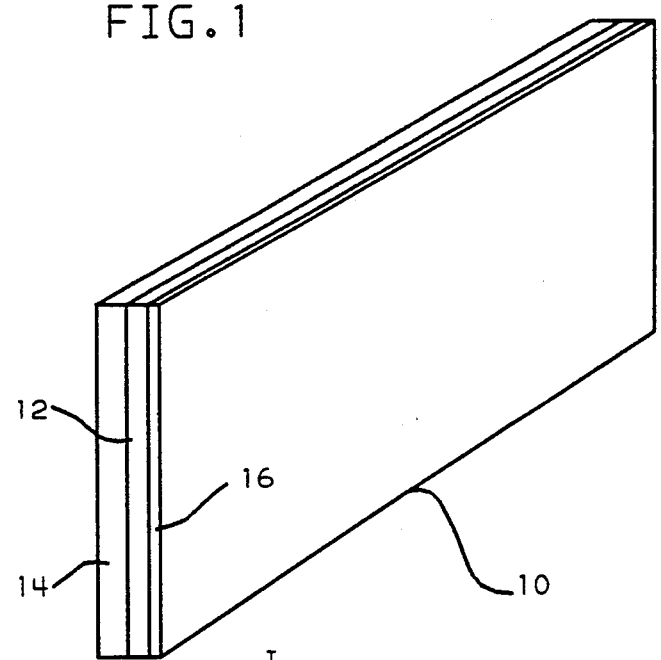
FIG. 1 is a perspective view of a Liquid Crystal Display device according to a first embodiment of the present invention.

Referring to FIG. 1, a liquid crystal display 10 according to the present invention is shown. The display consists of a layer 12 of liquid crystal material, such as twisted nematic material, sandwiched between a common electrode-such as a conducting glass plate 16, and a silicon substrate 14 supporting a matrix of electrodes, each driven by a field effect transistor circuit and each defining a picture element (PEL).

Figure 2:
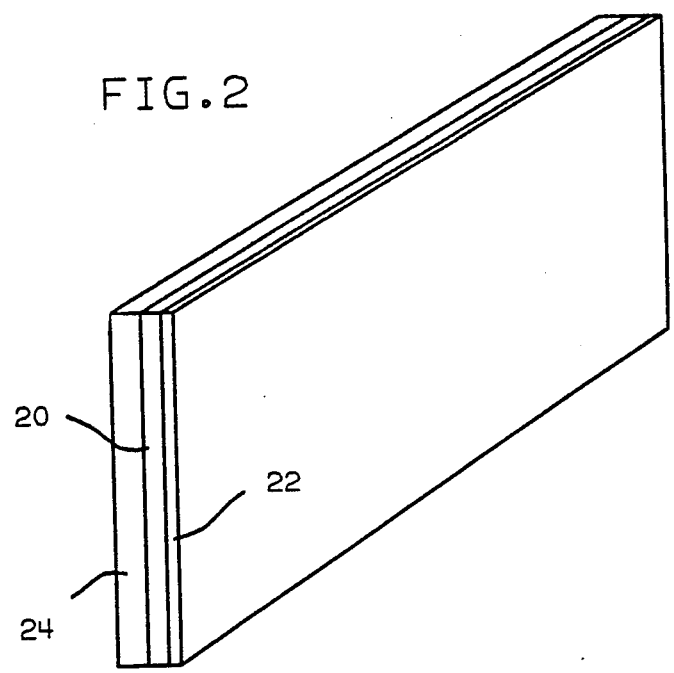
FIG. 2 is a perspective view of a Liquid Crystal Display device according to an alternate embodiment of the present invention.

An alternative embodiment of the present invention is shown in FIG. 2. This embodiment includes a liquid cyrstal material 20 sandwiched between a glass plate 22 and a polysilicon layer 24 on fused quartz or alumina. The deposited polysilicon is used to form FET devices.

Figure 3:
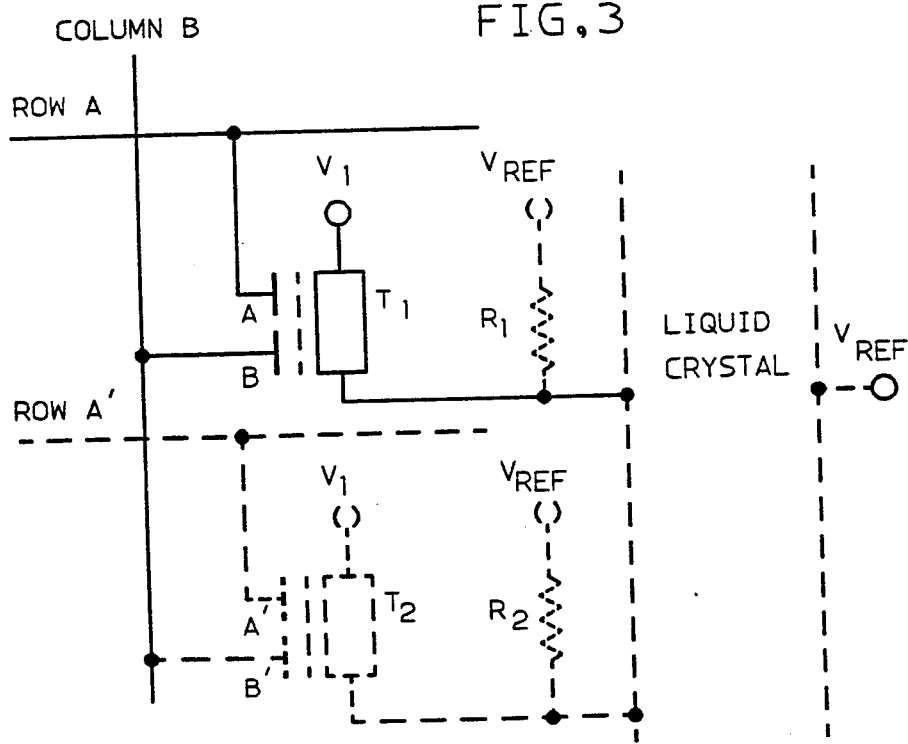
FIG. 3 is a schematic diagram of a PEL drive circuit according to the present invention.

The drive circuit according to the present invention for driving liquid crystal display PELs is shown in FIG. 3. FET transistor T1 is an electronically alterable FET such as described in the DiMaria article referred to above. For polysilicon devices on large area glass a similar structure can be made as a dual electron injector structure as is described in DiMaria et al. The process includes chemical vapor deposition to make the Si rich $SiO_2/SiO_2/Si$ rich $SiO_2$ Si rich $SiO_2$ $SiO2$ sandwich layer. Due to the different doping and conduction characteristics of the polysilicon FET devices, the thicknesses of the dual electron injector structure (DEIS) may be changed.

The operation of the DEIS electronically alterable FET is as follows.

To 'erase' T1, i.e. to transfer negative charges from control gate to floating gate, the coincidence of a positive voltage of approximately plus 15 volts at input A (row A) and 0 volts at input B (column B) would make T1 an enhancement-mode FET with a threshold voltage (VTH) of approximately +8 V. Each unselected device sharing the same column as T1 would have its ROW input (A' etc) biased to 7.5 V. The 7.5 V would be inadequate bias to cause these other devices to be turned on. That is insufficient voltage to cause any change in the conductive nature of the 'unselected' devices. The voltage that controls the conduction of the FET devices is between control gate A (A' etc) and the source which are all commonly connected to V1. V1 signal is always positive (see FIG. 4). Note also that the voltage across the two inputs of the unselected devices in column B is only 7.5 v (7.5–0) as all other columns are biased to 7.5 volts the devices in row A would be biased to 7.5 volts (15–7.5) whereas all the other devices would be biased to 0 volts (7.5–7.5). Hence, the only devices which could have any charge transfer would be in column B and have 0 volts on the row input. All other devices would have inadequate field across the inputs to cause any charge transfer from control gate to floating gate.

Similarly, when it is desired to 'write' T1, remove negative charges from the floating gate by applying a positive voltage of 15 V to input B and 0 V to input A. Again, the 'unselected' devices sharing the same column will have their respective row voltage set at 7.5 V and thereby be undisturbed with a total voltage of 7.5 V (7.5−15) applied across their control gates. With proper design of surface doping etc. each selected device with its floating gate charge removed will have a negative threshold voltage of −8 V, hence having become a depletion mode device.

Figure 4:
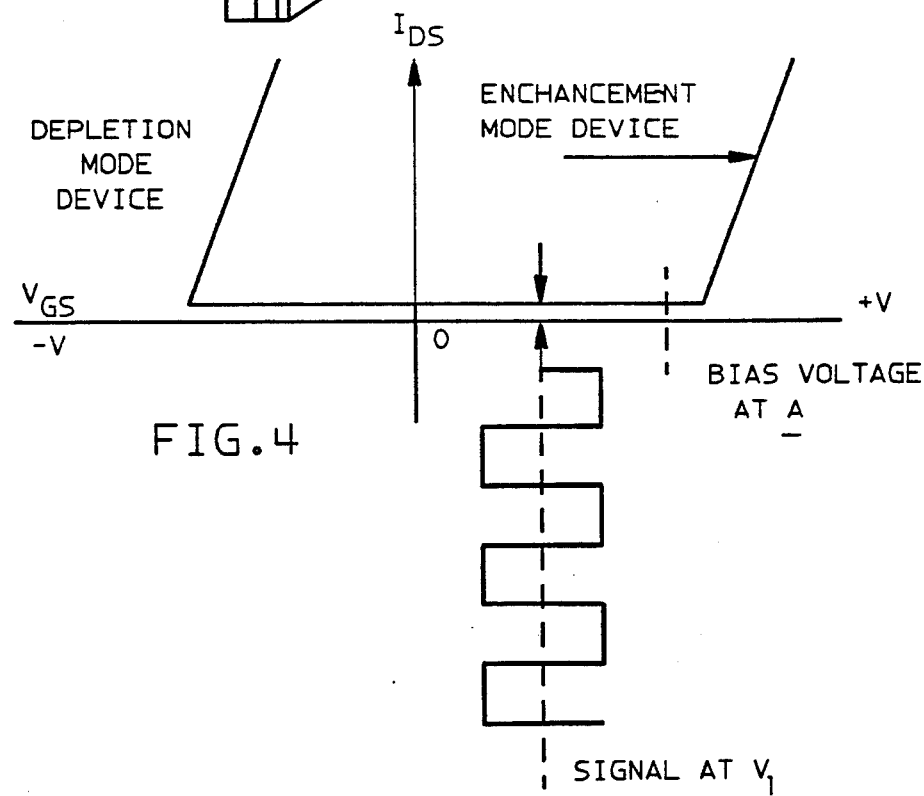
FIG. 4 is a graphical representation of the transfer function of the drive circuit of FIG. 3.

FIG. 4 is a transfer diagram showing the current voltage characteristics of an enhancement mode device and a depletion mode device in accordance with the present invention.

To demonstrate how the drive circuitry applies bias to the selected PELs consider first the case where T1 has been 'written' and is now a depletion device. The total drive voltage across the gate of the device is (voltage at A—voltage at V1). Notice that V1 is an AC voltage of 2 V to 4 V peak-to-peak riding on a bias voltage (VREF) of approximately 3 v. (could vary several volts from this). Since T1 is now a depletion device with considerable forward bias, its impedance is relatively low (and very low compared to the liquid crystal impedance. As a result, the voltage impressed across the liquid crystal PEL is the full AC voltage (2-4 v p-p) with NO DC component.

FIG. 4 shows the wave form at V1.

Note also that the net voltage at V1 is always positive and hence the voltage between the FET gate (A etc) and source (V1) of any FET in the array is always less than 7.5 v which is below the enhancement device's threshold voltage.

The 'erased' FET's which are enhancement devices will look like very high impedance to the liquid crystal and therefore no AC signal will pass through these FETs and be impressed across the LC cell. One can consider the impedance of the 'biased off enhancement FET's as a very small capacitance and the LC cell as a very large capacitance, the ratio of perhaps 1000. Or equally, one can consider the resistance of the biased-off enhancement FET to be greater than 100 megohms and R1 (R2 etc.) to be 1 megohm. Again, the impedance ratio is such as to assure no measurable AC signal across un-selected PELs.

As stated above, it is very important to assure no average DC appears across the LC PEL. Hence, the resitors R1, R2 etc. are introduced to provide a conducting path for the off-biased FETs. All FETs have some leakage current and assuming maximum never exceeds 25 nano-amps, the DC shift with R's at 1 megohm would be within 25 mv, an acceptable level for liquid crystals.

In summary, the circuit shown in FIG. 3 ensures the ability to write or erase high content, liquid crystal displays with a very simple drive circuit. Such a simple drive circuit in accordance with the present invention eliminates the need for refresh electronics including memory. Further, information is not lost due to power interruption.

Thus, while the invention has been described with reference to preferred embodiments thereof, it will be understood by those skilled in the art that various changes in form and details may be made without departing from the scope of the invention.

What is claimed is:

1. A high content liquid crystal display device (LDC), comprising:
    a glass plate;
    a polysilicon deposited substrate supporting a matrix of electrodes; each of said electrode defining a picture element (pel) in said LCD;
    a liquid crystal material interposed between said glass plate and said substrate;
    a plurality of electronically alterable FET devices, there being one or more of said electronically alterable FET devices associated with each of said electrodes, each said electronically alterable FET device comprising internal data storage and pel signal selection means; and
    means for selectively actuating said electronically alterable FET devices to display an image on said LCD.

2. A high content liquid crystal display device (LCD) according to claim 1, wherein said substrate comprises a fused quartz material.

3. A high content liquid crystal display device (LCD) according to claim 1, wherein said substrate comprises alumina.

4. A high content liquid crystal display device (LCD) according to claim 1, wherein said liquid crystal material comprises a twisted nematic liquid crystal material.

5. A high content liquid crystal display device (LCD) according to claim 1, wherein said electronically alterable FET devices comprise a dual electron injector structure.

6. A high content liquid crystal display device (LCD) according to claim 5, wherein said electronically alterable FET devices comprise a deposited polysilicon material.

* * * * *